United States Patent [19]

Vinciguerra et al.

[11] Patent Number: 4,632,634
[45] Date of Patent: Dec. 30, 1986

[54] SYSTEM FOR FIXING THE STATOR NOZZLES TO A POWER TURBINE CASING

[75] Inventors: Costantino Vinciguerra, Florence; Leonardo Arrighi, Pisa, both of Italy

[73] Assignee: Nuova Pignone S.p.A., Florence, Italy

[21] Appl. No.: 654,559

[22] Filed: Sep. 26, 1984

[30] Foreign Application Priority Data

Oct. 3, 1983 [IT] Italy ................. 23110 A/83

[51] Int. Cl.⁴ .......................... F01D 25/24; B21K 3/00
[52] U.S. Cl. ...................................... 415/139; 29/23.5; 29/156.8 R; 29/526 R; 415/189; 415/190; 403/336; 403/338; 24/331; 24/457
[58] Field of Search ........ 29/23.5, 156.8 R, 156.8 CF, 29/156.8 B, 526 R; 415/189, 190, 134, 139; 403/335, 336, 338; 24/331, 338, 457

[56] References Cited

U.S. PATENT DOCUMENTS

| | | | |
|---|---|---|---|
| 2,843,357 | 7/1958 | Spindler, Jr. | 415/189 |
| 3,501,247 | 3/1970 | Tournere | 415/189 |
| 3,728,041 | 4/1973 | Bertelson | 415/189 |
| 4,114,368 | 9/1978 | Davis et al. | 415/189 X |
| 4,119,389 | 10/1978 | Gee | 415/189 |
| 4,142,827 | 3/1979 | Vinciguerra | 415/189 |
| 4,255,086 | 3/1981 | Roberts | 29/156.8 R X |

FOREIGN PATENT DOCUMENTS

| | | | |
|---|---|---|---|
| 590888 | 4/1959 | Italy | 415/189 |
| 586562 | 3/1947 | United Kingdom | 415/190 |

Primary Examiner—Howard N. Goldberg
Assistant Examiner—R. S. Wallace
Attorney, Agent, or Firm—Birch, Stewart, Kolasch & Birch

[57] ABSTRACT

A system for fixing nozzles to a power turbine stator casing, in which each nozzle sector is locked to the respective shroud by means of a key which has its two diverging vertical flanges inserted into a radial dovetail guide in the front surface of the shroud, where it is held in position by an elastic element or spring acting between the key and the inner wall of the guide, its lower vertical nose or beak acting as a shoulder abutment for a radial fork of the nozzle sector, which is mounted over, and kept centered by, the two projecting side-pieces of said key, which also has a projection at its upper end. Each shroud is locked to the stator casing by an insertion-fit between the uncinated edges of a cavity in the outer peripheral surface of the shroud and the corresponding uncinated edges of a circumferential cavity in the stator casing, the insertion being secured by a leaf spring acting between the mutually facing, uncinated edge-free walls of the two said cavities. Centering pins are also provided, inserted into contiguous facing semi-cavities provided in the front surface of the shroud and in the front surface of the stator casing respectively.

6 Claims, 7 Drawing Figures

SYSTEM FOR FIXING THE STATOR NOZZLES TO A POWER TURBINE CASING

BACKGROUND OF THE INVENTION

This invention relates to a new system for fixing the stator nozzles to a power turbine casing in a simple, rational, rapid and effective manner.

In order to keep a power turbine stator casing as cold as possible, the stator blades or nozzles traversed by the hot gas are not fixed directly to the stator casing, but instead are combined into sectors, each of two or three nozzles, and are insulated from the stator casing by means of spacer-supports of material which is a poor conductor of heat, known as shrouds.

In the present state of the art, the system most widely used for connecting the nozzle sectors to the shrouds and for connecting these latter to the stator casing uses connection pins or bolts, which make it necessary to form either through or threaded holes in the members to be connected together, according to requirements. However, such a method gives rise to considerable drawbacks due in particular to the fact that said holes constitute a dangerous triggering point for cracks which originate as a result of machine "thermal fatigue" phenomena, and can lead to the fracture of various components, thus considerably limiting the thermal fatigue life of said components.

Another frequent and very annoying drawback is due to the accidental fall of the fixing nut while being screwed on to the threaded shank, leading to a considerable loss of time by virtue of the fact that the nut has to be sought in the rotor.

Again, the known method does not allow those components bolted together to undergo differential thermal expansion in a radial direction, as would be desirable, and in addition allows the "throat area" tolerances between one nozzle sector and the two adjacent sectors to be respected only by using complicated systems involving the use of a nozzle carrier ring, an adjustment operation on the nozzle at the moment of mounting the ring, and the use of two eccentric pins in order to fix the nozzles in the position in which they lie after being mounted in the nozzle carrier ring.

SUMMARY OF THE INVENTION

The object of the present invention is to obviate the aforesaid drawbacks by providing a system which allows rapid and effective fixing of the stator nozzles to a power turbine casing without the need for through holes and bolts, with easy adjustment of the "throat areas" in order to satisfy the set tolerances, and with the facility for differential radial expansion between the nozzle sectors and shrouds.

This is attained substantially in that each nozzle sector is fixed to the corresponding shroud by means of a key comprising two diverging vertical flanges which are inserted into a corresponding radial dovetail guide provided in the front surface of the shroud, the key being held in position without the possibility of withdrawal by an elastic element or spring acting between the key and the inner wall of the guide in the sense of exerting a compression action on this latter, said key being provided lowerly with a vertical nose or beak acting as a shoulder abutment for a radial fork which is rigid with the nozzle sector and is mounted over, and kept centered by, the two projecting sidepieces of said key.

The advantages of such a keyed connection between the shroud and nozzle sector are apparent. Besides making assembly extremely simple, the radially slidable connection between the shroud and key and between this latter and the nozzle sector enables the loads to be transmitted from the nozzle sector to the shroud and prevents the sector and shroud becoming unconnected in a radial direction while allowing the thermal expansion of the sector which occurs as a result of hot gas passage.

Again, the nozzle sector is always kept centered with respect to the power turbine axis by the two projecting sidepieces of the key which guide the sector in a radial direction, and adjusting the "throat area" between one nozzle sector and the two adjacent sectors in order to satisfy set tolerances is now made extremely simple, this being done by merely using keys during assembly which are taken from a range of similar keys which differ from each other only by the fact that the machining allowance on the faces of said two projecting sidepieces has been removed to a different extent on one face than on the other, while keeping the distance between the two faces constant.

Finally, the nozzle sectors can be immediately removed for possible replacement due to damage or for maintenance by merely withdrawing the key from its seat in the shroud by overcoming the action of said elastic element or spring which locks the key in said seat. In fact, in order to facilitate this operation and enable it to be done manually by means of a simple tool in the form of a chisel, according to a further characteristic of the present invention the key is provided with a projection at its upper end.

Finally, according to a further characteristic of the present invention, the shrouds are locked to the power turbine stator casing by an insertion joint comprising a cavity provided in the outer peripheral surface of each shroud and having its longitudinal edges uncinated in the same direction, into said cavity there being insertion-fitted the corresponding edge, uncinated in the opposite direction to the former, of an analogous circumferential cavity provided in the lower surface of the stator casing, the insertion fit being secured by a leaf spring acting between the mutually facing, uncinated edge-free walls of said cavities, the position of the shroud relative to the casing being secured by centering pins which are inserted into contiguous facing semi-cavities provided in the front surface of the shroud and in the front surface of said stator casing respectively.

BRIEF DESCRIPTION OF THE DRAWINGS

The invention is described in detail hereinafter with reference to the accompanying drawings which illustrate a preferred embodiment thereof by way of non-limiting example only, in that technical and/or constructional modifications can be made thereto without leaving the scope of the present invention.

In said drawings:

FIG. 7 is a perspective view to an enlarged scale showing the leaf spring used in the fixing system according to the invention.

DETAILED DESCRIPTION OF THE INVENTION

Figure 1:
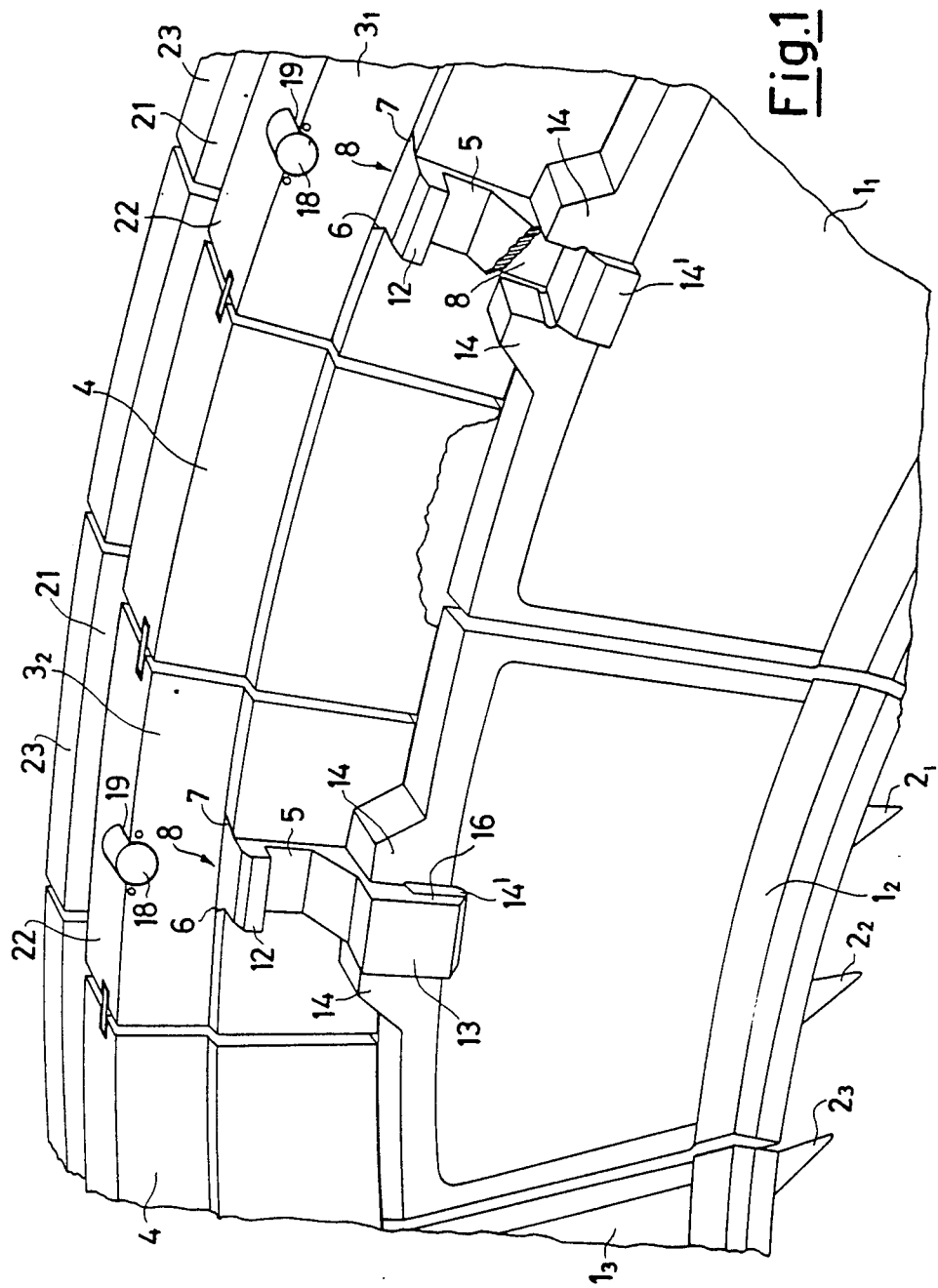
FIG. 1 is a partial perspective view of the connection of the nozzle sectors to the shrouds by means of keys according to the present invention.

In the figures, the reference numerals $1_1$ indicate the various sectors each of two nozzles $2_1$, which are to be locked to spacer-supports $3_1$, known as shrouds, which are connected together by connection supports 4 perfectly analogous with the shrouds. Said locking is done by means of keys 5, the two diverging vertical flanges 6 and 7 of which are inserted into a corresponding radial dovetail guide 8 provided in the front surface of the shrouds $3_1$. The keys 5 are held in position without the possibility of withdrawal from the guide 8 by means of an elastic element or spring 9 which is curved between two ledges 10 and 11 on the key so that its arcuate part exerts a compression action on the wall 8' of the guide 8 (see FIG. 2) which compels the key flanges 6 and 7 to adhere with pressure against the dovetail walls of the guide.

The keys 5 are also provided upperly with a projection 12 to facilitate their manual removal by means of a simple tool in the form of a chisel, and are provided lowerly with a vertical nose or beak 13, of which the inner projecting part 13' constitutes the axial shoulder abutment for the contacting wall 14' of a radial fork 14 which is rigid with the various nozzle sectors $1_1$ and is mounted over two projecting sidepieces 15 and 16 of said key. In addition to acting as a radial guide for the forks 14 and consequently for the nozzle sectors $1_1$, which are thus always centered with respect to the power turbine axis, the projecting sidepieces 15 and 16 also perform the function of adjusting the "throat areas" to within the required tolerances, this being done by simply removing the machining allowance constituting said two projecting sidepieces by different amounts in a suitable manner.

Figure 2:
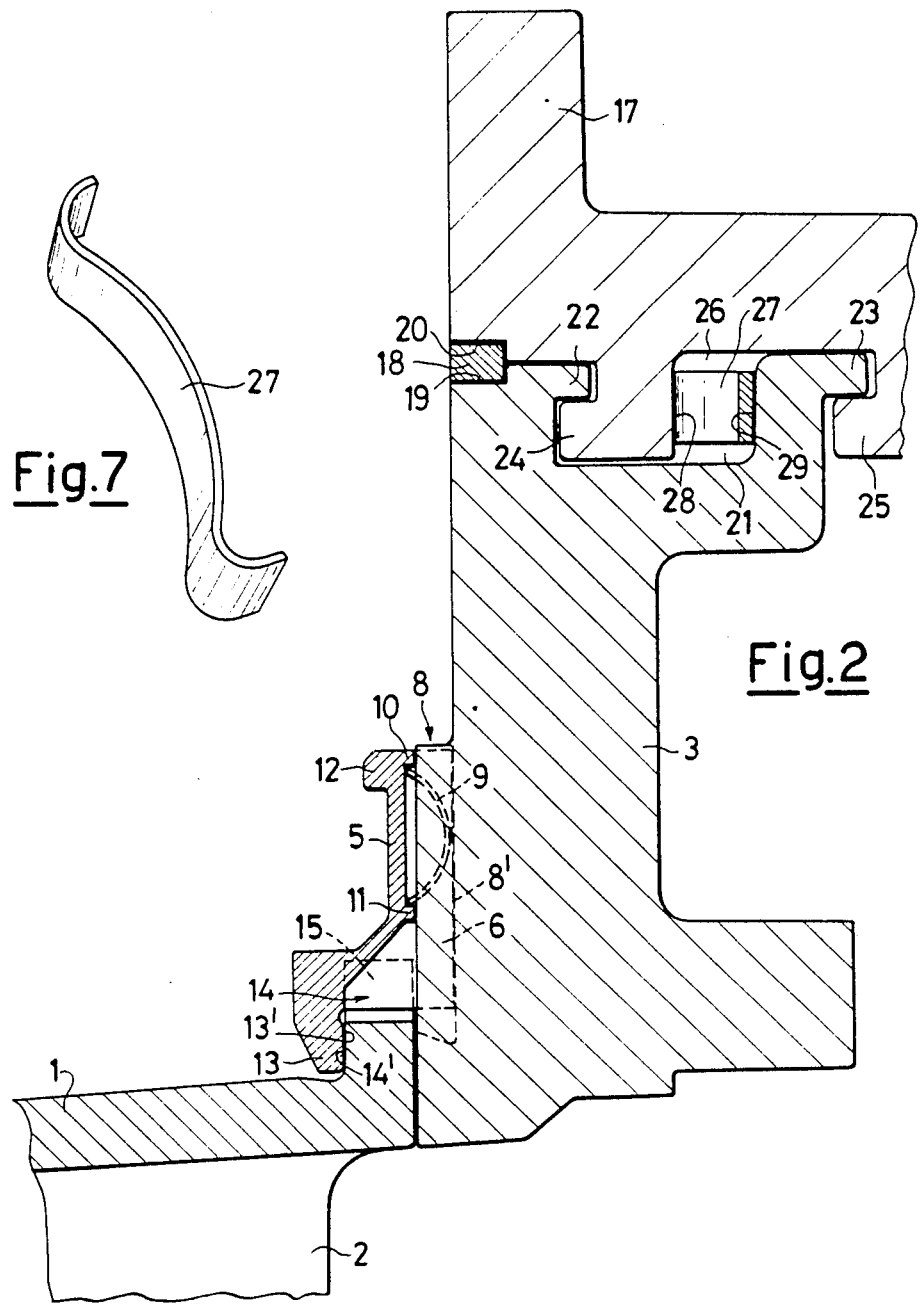
FIG. 2 is a side sectional view of the system for fixing the nozzles to a power turbine stator casing, according to the invention.
Figure 3:
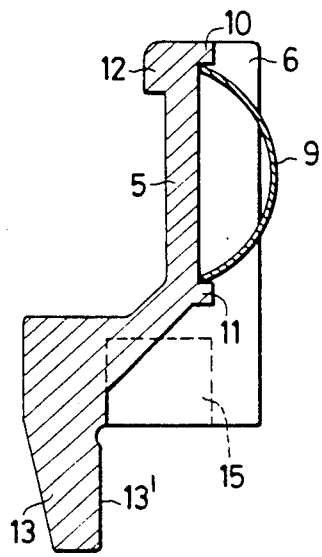
FIG. 3 is a side sectional view of the key according to the invention.
Figure 4:
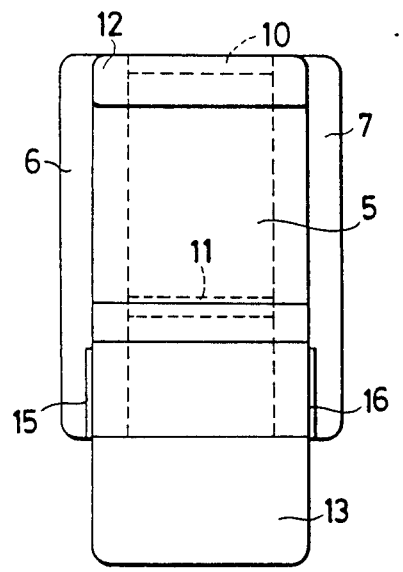
FIG. 4 is a front end view of the key of FIG. 3.
Figure 5:
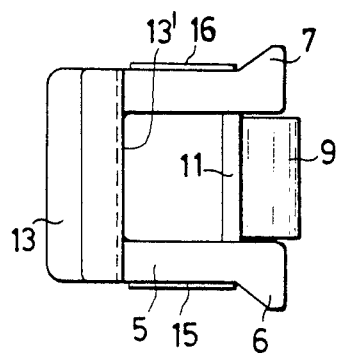
FIG. 5 is a bottom plan view of the key of FIG. 3.
Figure 6:
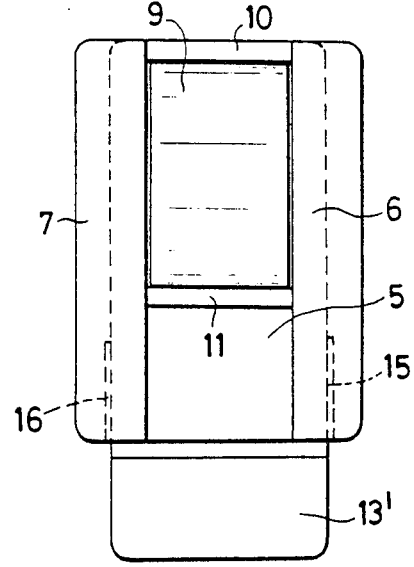
FIG. 6 is a rear end view of the key of FIG. 3.

The shrouds $3_1$, which are kept in a centered position with respect to the power turbine stator casing 17 (see FIG. 2) by means of centering pins 18 which are inserted into semi-cavities 19 in said shrouds and into the contiguous facing semi-cavities 20 in the casing 17, are then locked to said casing 17 by means of an insertion fit by which a cavity 21 provided in the outer peripheral surfaces of each shroud and having its longitudinal edges 22 and 23 uncinated in the same direction receives by insertion the corresponding edges 24 and 25, uncinated in the opposite direction to the former, of an analogous circumferential cavity 26 provided in the lower surface of the stator casing 17, the insertion fit being secured by a leaf spring 27 made to act between the contiguous facing walls 28 of the cavity 26 and 29 of the cavity 21 respectively (see FIG. 2).

We claim:

1. A power turbine, comprising:
   a power turbine stator casing;
   a shroud connected with said stator casing, said shroud having a radial dovetail guide in the front surface thereof;
   means for locking said shroud to said stator casing;
   a nozzle sector having a radial fork and an abutting wall of a radial projection adapted to receive a key;
   a key which connects said shroud with said radial fork of said nozzle sector, wherein said key comprises two diverging vertical flanges at the rear part thereof which are inserted into said radial dovetail guide in the front surface of said shroud, a vertical projecting guide nose which cooperates as an axially directed shoulder element with said abutting wall of said radial projection of said nozzle sector, a parallel pad on each of two opposing side faces of said key which pads slightly project laterally from said key and contact opposing surfaces of said radial fork; and
   spring means for biasing said two diverging flanges of said key against said dovetail guide to inhibit removal of said key by a compressive force between said diverging flanges and said dovetail guide.

2. The turbine of claim 1, and further comprising means for facilitating removal of said key.

3. The turbine of claim 2, wherein said means for facilitating removal of said key includes a projection extending at the upper end of said key.

4. The turbine of claim 1, wherein a cavity is formed in the outer peripheral surface of said shroud and said shroud has its longitudinal edges uncinated in a same first direction into said cavity, a cavity is formed in the lower surface of said stator casing and corresponding edges of said stator are uncinated in a second direction opposite to said first direction, said uncinated edges of said shroud being insertion fit with said uncinated edges of said stator casing, the insertion fit being secured by a leaf spring acting between mutually facing uncinated edge free walls of said cavities, the portions of said shroud relative to said casing being secured by pins which are inserted into contiguous facing semi-cavities provided in the front surface of the shroud and in the front surface of said stator casing, respectively.

5. The turbine of claim 1, wherein said spring means is a single elastic leaf spring provided in a cavity between said key and said shroud.

6. The turbine of claim 1, wherein said spring means is elongate and the two longitudinal ends thereof are pressed against corresponding ledges formed on the back surface of said key.

* * * * *